UNITED STATES PATENT OFFICE.

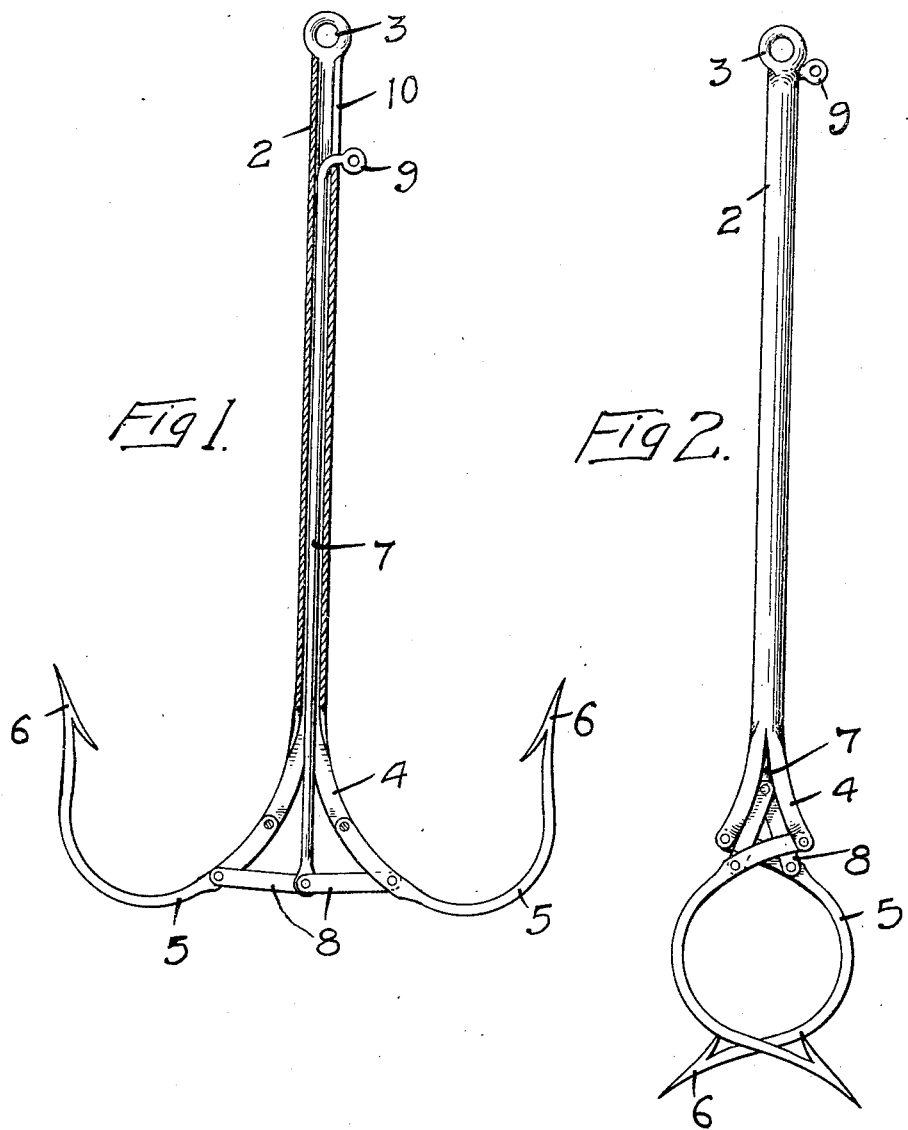

PETER REITHER, OF BENNETTVILLE, MINNESOTA.

FISH-HOOK.

961,259.  Specification of Letters Patent.  Patented June 14, 1910.

Application filed December 20, 1909. Serial No. 534,081.

*To all whom it may concern:*

Be it known that I, PETER REITHER, of Bennettville, Aitkin county, Minnesota, have invented certain new and useful Improvements in Fish-Hooks, of which the following is a specification.

My invention relates to fish hooks and particularly to one of the self releasing type, the object of the invention being to provide a hook which can be released from the mouth of the fish without the necessity of grasping the fish in the hand. Some fish are provided with sharp fins or spines and the fisherman often has his hand pierced in attempting to remove the fish from the hook. My invention eliminates entirely the necessity of taking the fish in the hand.

The invention consists generally in a hook having a pivoted barb portion with means for locking it in its opened position, and provided with means operable at a distance for releasing the locking device.

In the accompanying drawings forming part of this specification, Figure 1 is a side elevation, partially in section, of a fish hook embodying my invention, Fig. 2 is a similar view showing the hook closed.

In the drawing, 2 represents a hollow spindle or tube having an eye 3 formed at one end thereof and provided at its opposite end with a fork 4 whereon the shanks 5 of the barbed points 6 are pivoted. Within the hollow spindle is a trip rod 7, pivotally connected at its lower end with links 8, which are pivoted to the shanks 5. The upper end of the trip rod is outwardly turned and provided with an eye 9 that is adapted to slide in a slot 10 in the tube 2. To this eye 9 a trip line may be attached and held by the fisherman. When the fish is caught on the barbed point, the shank will be rigidly held by the links 8 and as long as the links are in line with one another the shanks will be locked in their open position, as indicated in Fig. 1. As soon, however, as the fish is securely hooked and lifted out of the water into the boat or upon the land, the fisherman will pull on the trip line or move the trip rod 7 lengthwise, breaking the toggle joint formed by the links 8, allowing the shanks of the hooks to swing inwardly toward one another. As the shanks swing by one another to the position indicated in Fig. 2, their barbed points will pass and if one of them is thrust through the mouth of a fish, it will be disengaged by the pressure of the other barb, each shank, as clearly indicated in Fig. 2, swinging past the point of the barb on the other shank, thus freeing the fish which may be caught thereon. When this has been done the hook is ready to be baited again and the fishing operation resumed.

With this device it is not necessary to handle a fish and the hands and the clothing need not be soiled by contact with the fish, and all danger of injury from the fins or spines of the fish will be entirely avoided.

I claim as my invention:

1. A fish hook comprising a support, outwardly turned barbed points having their shanks pivoted on said support, a trip rod extending between the pivots of said shanks, links connecting said trip rod with said shanks between the pivots of said shanks and said barbed points, said links when in line with one another locking said shanks in their open position, for the purpose specified.

2. A fish hook comprising pivoted shanks having barbed points adapted to swing toward one another, the shank of one point disengaging the fish from the barb of the other point as the shanks pass one another, and a trip device having a toggle link connection with said shanks, said trip device including a rod depending between said shanks, said links pivotally connecting the end of said rod with said shanks and in line with one another when the device is open for use.

In witness whereof I have hereunto set my hand this 14th day of December 1909.

PETER REITHER.

Witnesses:
C. H. WARNER,
L. M. WILLCUTS.